A. G. HOWARD.
ATTACHMENT FOR TELEPHONES.
APPLICATION FILED MAR. 9, 1909.
956,530.
Patented May 3, 1910.
6 SHEETS—SHEET 1.
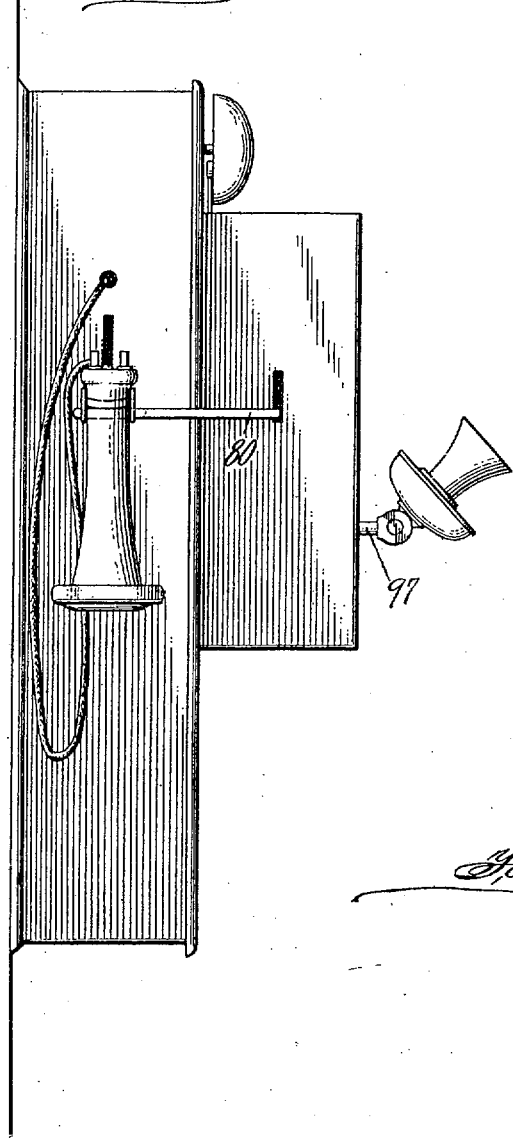
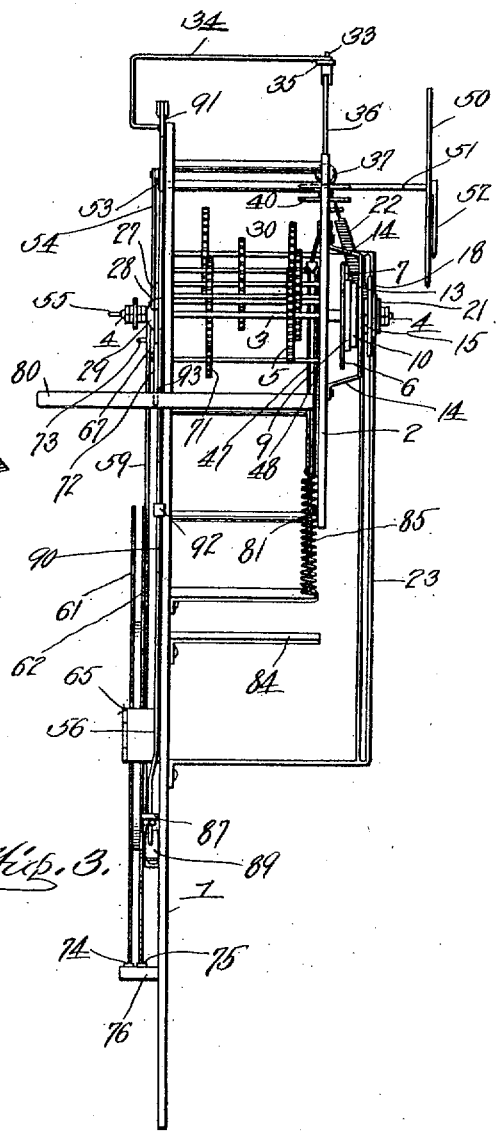
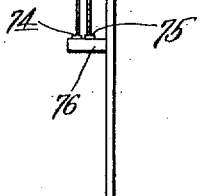
Witnesses
Inventor
A. G. Howard

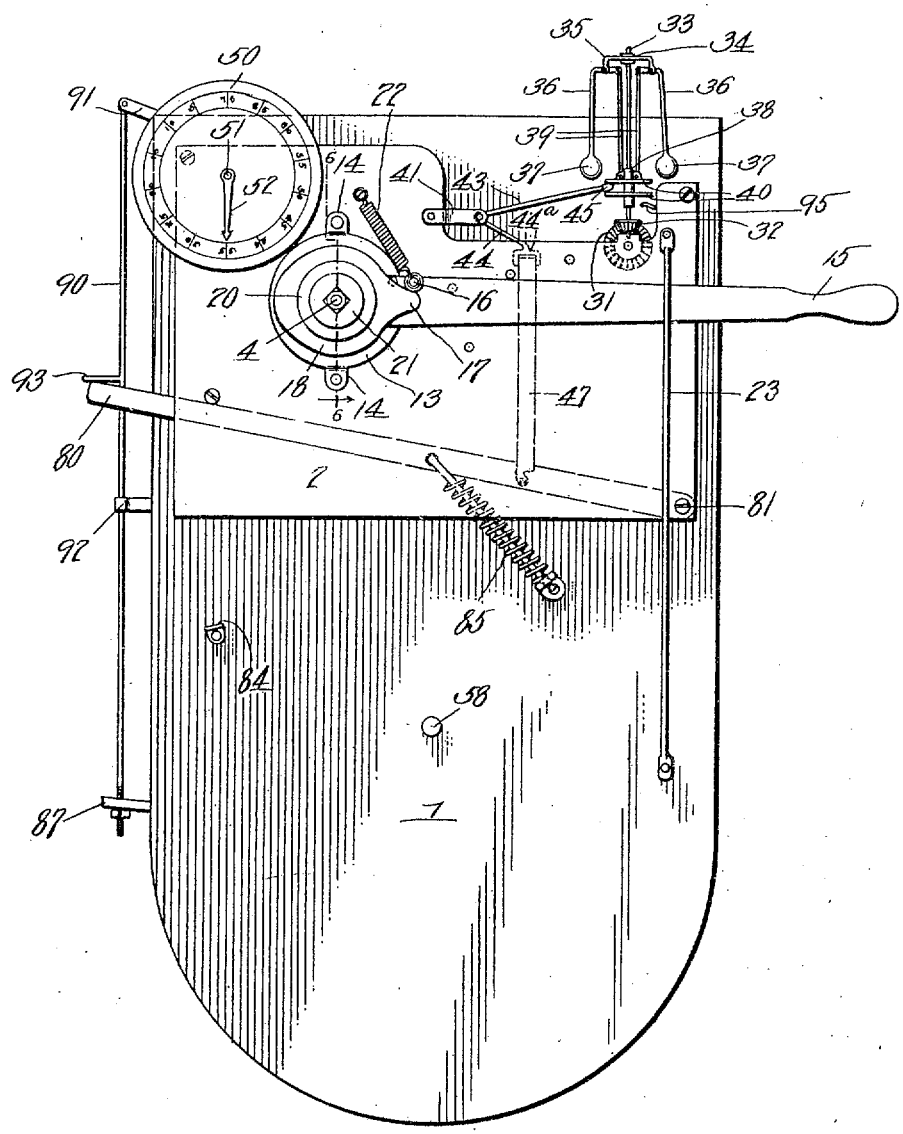

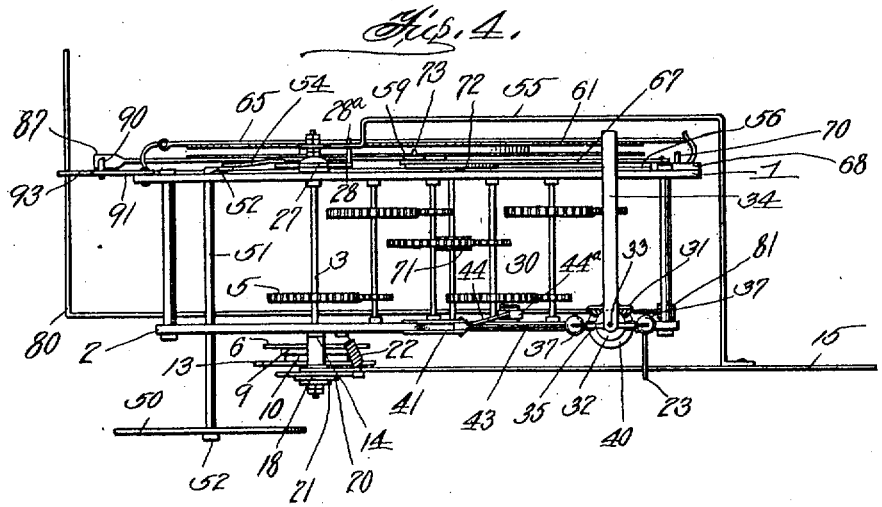
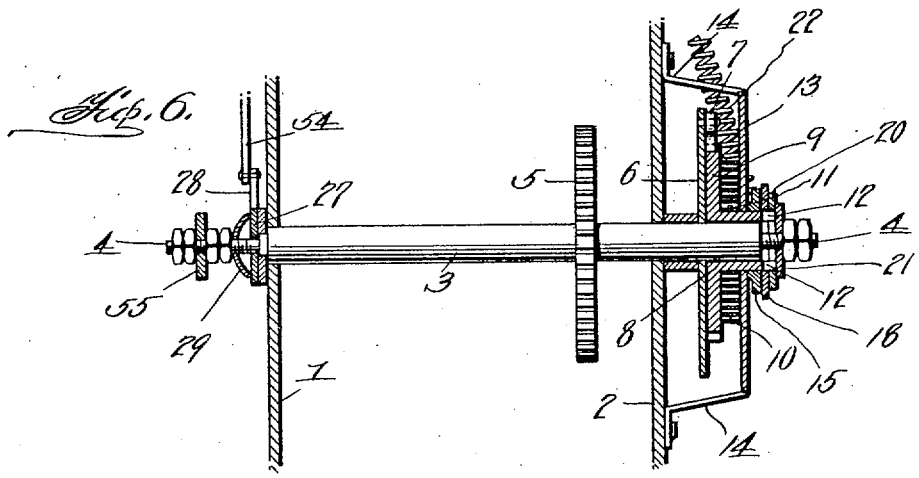
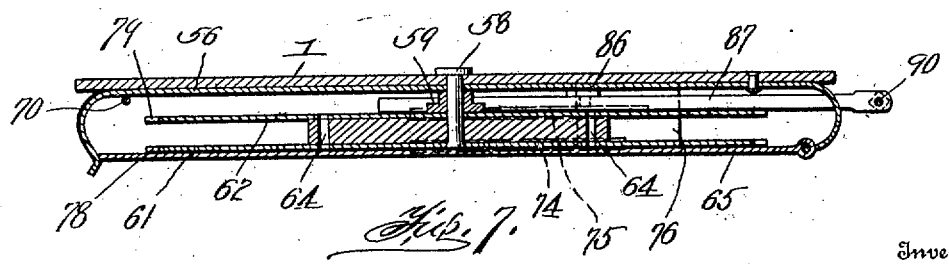

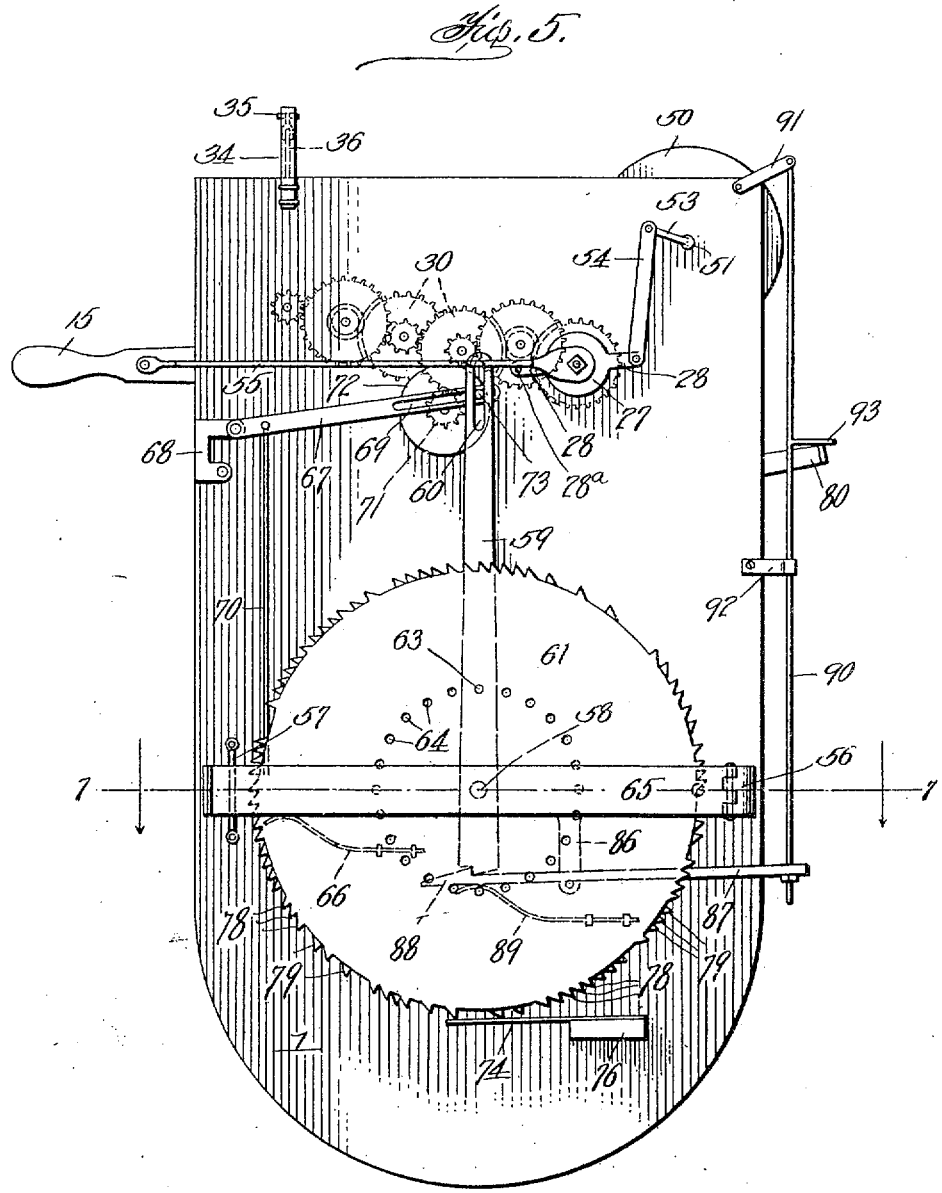

A. G. HOWARD.
ATTACHMENT FOR TELEPHONES.
APPLICATION FILED MAR. 9, 1909.
956,530.
Patented May 3, 1910.
6 SHEETS—SHEET 5.
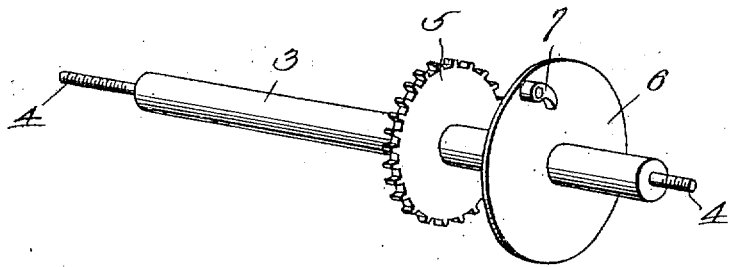
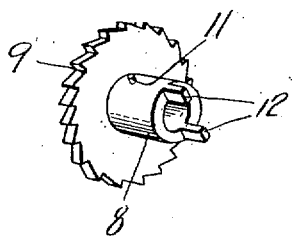
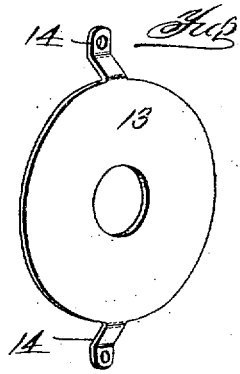
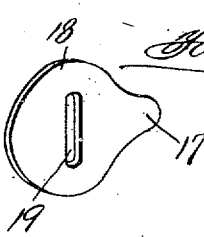
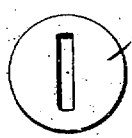
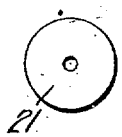
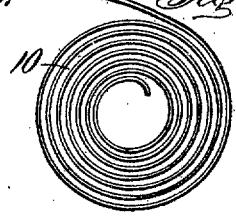
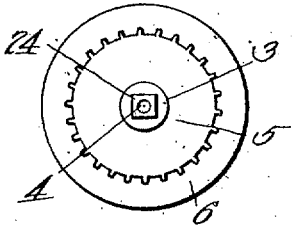
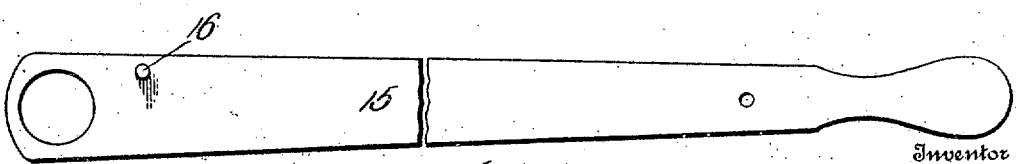
Witnesses
Inventor
A. G. Howard

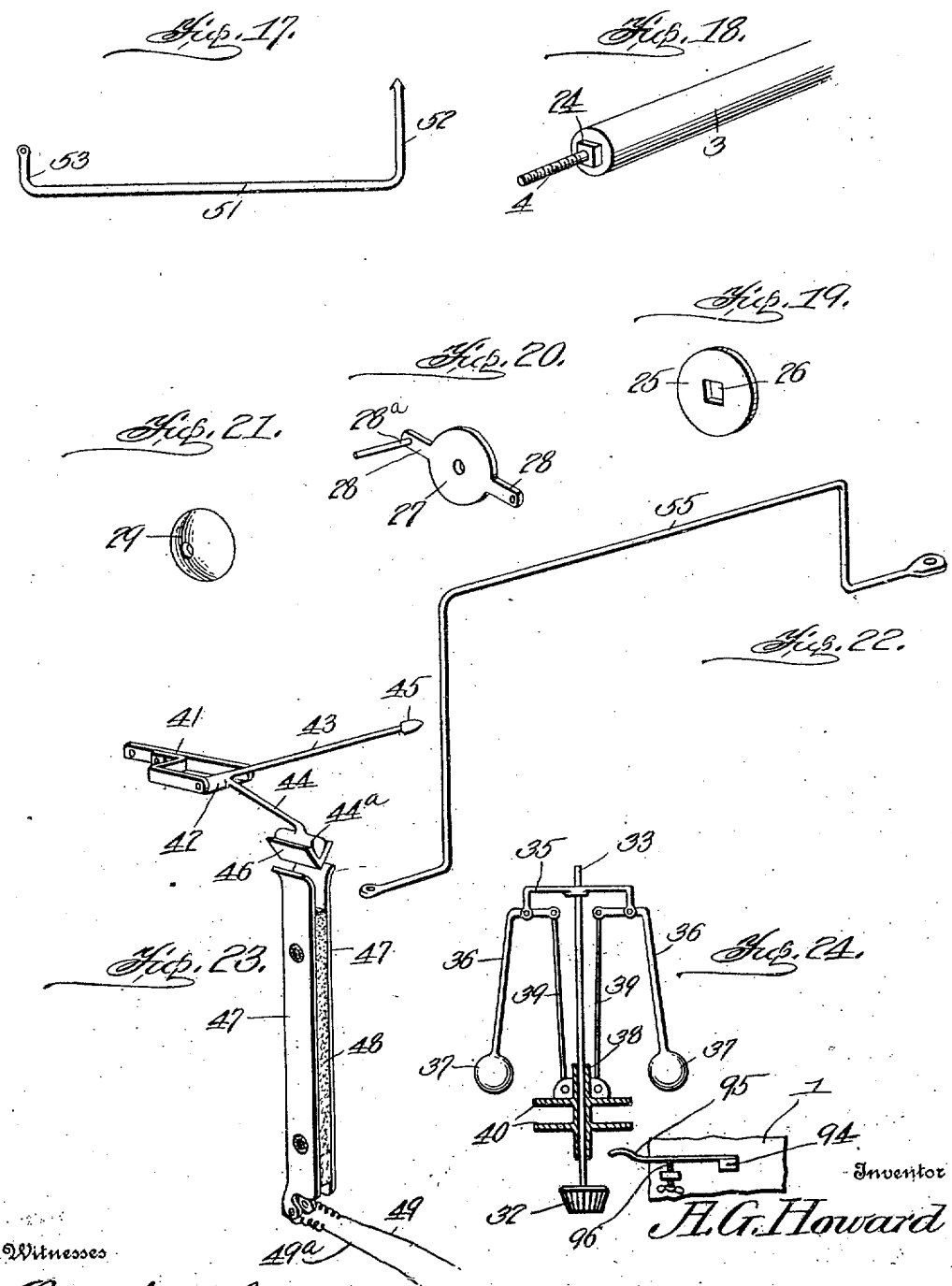

UNITED STATES PATENT OFFICE.

ABEN GUSTAF HOWARD, OF HOLDREGE, NEBRASKA.

ATTACHMENT FOR TELEPHONES.

956,530.  Specification of Letters Patent.  Patented May 3, 1910.

Application filed March 9, 1909. Serial No. 482,307.

*To all whom it may concern:*

Be it known that I, ABEN G. HOWARD, a citizen of the United States, residing at Holdrege, in the county of Phelps and State of Nebraska, have invented a new and useful Improvement in Attachments for Telephones, of which the following is a specification.

This invention is an attachment for telephones, and may be built into a telephone casing, or it may be applied to telephones already in use.

The object of the invention is to allow two or more parties to communicate with each other without permitting other parties to listen without the knowledge of the first mentioned parties.

A further object of the invention is to provide a time indicating dial so that a party using the line can see exactly how long they use the line without interruption, that is without breaking the circuit, such time indicating means being especially valuable where there is a time limit, or where payment is charged according to the time during which the telephone is in use.

Many telephone companies have rules covering both of these points, forbidding any person to take down his receiver for the purpose of listening to conversation between other parties, and also limiting the use of the line for a limited time only, usually from three to five minutes. The first rule has been practically impossible of enforcement owing to the difficulty of detecting the party breaking into the circuit, and the second is the cause of many disputes as to the actual time parties had consumed.

With these objects in view, my invention consists of an attachment for telephones having connected thereto a code signal peculiar to each telephone upon a party line, said signal consisting of tuning forks or key notes of a different pitch together with means for vibrating said forks or keys in a certain manner upon the completing of an electric circuit thereby sending over the line certain musical tones easily recognized, and which indicate the telephone from which said tones were sent.

The invention also includes an index hand traveling over a dial, which hand indicates, by the extent of its travel, the length of time the line has been used at any given time.

The invention also consists in the novel features of construction by means of which said signals and time indicating devices are set in operation, controlled, and otherwise adapted to attain the objects above set forth.

In the accompanying drawings: Figure 1 is a side elevation of the left hand side of a telephone with my attachment in place. Fig. 2 is a front elevation of the attachment the casing being removed. Fig. 3 is an end elevation the casing being removed. Fig. 4 is a top plan view the casing being removed. Fig. 5 is a rear view of the parts shown in Fig. 3. Fig. 6 is a section on the line 6—6 of Fig. 2. Fig. 7 is a section on the line 7—7 of Fig. 5. Fig. 8 is a detail perspective view of a main shaft. Fig. 9 is a perspective view of a winding drum. Figs. 10, 11, 12, 13, 14, 15 and 16 are detail views of parts carried by the shaft shown in Fig. 8 and the winding drum of Fig. 9, and shown detached. Fig. 17 is a detail view of an index hand and shaft. Fig. 18 is a detail perspective view showing an end portion of the shaft shown in Fig. 8. Figs. 19, 20 and 21 are perspective views of parts carried by the end of the shaft shown in Fig. 18. Fig. 22 is a perspective view of an angled lever. Fig. 23 is a perspective view of a circuit making and breaking device. Fig. 24 is a side elevation, partly in section of a governor adapted to coöperate with the circuit making and breaking device shown in Fig. 23.

In constructing this attachment, I employ two metal plates 1 and 2, spaced apart, the plate 1 being larger and extending lower down than the plate 2. These plates are connected by suitable bolts to form a rigid frame and in the plates I journal a shaft 3, the opposite ends of which are reduced and threaded as shown at 4. This shaft has fixed upon it a gear wheel 5, which forms a gear of a train to be hereafter referred to. A disk 6 is also fixed upon the shaft 3, said disk carrying a dog 7. Over an end portion of the shaft 3 fits a sleeve 8 which at one end carries a ratchet wheel 9, the sleeve and ratchet wheel fitting against the disk 6, and the dog 7 engaging the said ratchet wheel, thus locking the sleeve 8 and the shaft 3 together when the sleeve 8 is rotated in one direction. A spring 10, of the flat coiled type is placed upon the sleeve 8, the inner end of the spring being secured to a pin 11 carried by the sleeve 8, and the outer end of the spring being secured to a suitable post or pin carried by the plate 2. The outer end of the sleeve 8 is provided with two oppositely arranged longitudinally extending lugs 12. Over the sleeve fits loosely a circular plate 13 provided with upper and lower angled ears 14 and which when the parts are assembled is adjacent the ratchet wheel 9, the said ratchet working between the disk 6, to which it is connected by the dog 7, and the plate 13, the disk 6 being connected to the shaft 3 and the plate 13 being connected to the frame plate 2, as shown in Fig. 2. A winding lever 15 is mounted loosely upon the sleeve 8, and carries a lateral projection 16 which engages a projecting ear 17 formed upon a disk 18 which is provided with a rectangular slot 19 which slot fits over the projecting lugs 12 of the sleeve 8. A suitable washer 20 similarly slotted is also fitted over these lugs against the disk 18, and a washer 21 is fitted over the reduced threaded portion 4 at this end of the shaft, which threaded portion projects between and beyond the lugs 12. A suitable nut is then threaded on to this projection thus locking the washers, the winding disk 18 and the winding lever 15 in place. It will be obvious that as the lever 15 is moved downwardly the projection 16 will bear upon the ear 17 of the winding disk, thus giving a partial rotation to said disk, and to the sleeve 8, thus winding the spring. The winding lever being loose upon the sleeve is then drawn back to its normal position by means of a spring 22, and as the winding disk 18 remains turned in the position into which it was forced by the downward movement of the winding lever, additional movement of said lever will not affect the spring, until after the spring is unwound to a certain extent and the ears 17 brought either into or toward its normal position. It is therefore impossible to wind the spring beyond certain limits. The winding lever works between suitable guide bars 23 secured at their upper ends to the plate 2 and at their lower ends to the plate 1.

It will be understood that the parts above described, that is the sleeve, the winding lever and adjacent parts are all upon one end portion of the shaft 3. The opposite end of the shaft, shown in detail in Fig. 18 has a reduced squared portion 24 in addition to the threaded portion 4 and over this portion 24 fits a disk 25 having a squared socket 26. Fitting over a smooth portion of the reduced portion 4 is a friction disk 27 carrying oppositely extending arms 28, and held in frictional contact with the disk 25 by means of a concavo convex spring washer 29 which is held upon the reduced portion 4 by means of a suitable nut. This washer pressing the disk 27 against the disk 25 will cause both of them to rotate together, and then will also rotate with the shaft 3, which shaft is rotated by the winding of the spring through the medium of the ratchet wheel and dog previously described.

To control the operation of the device, I provide a governor driven by means of a gear train 30, the gear wheel 5 being the first gear wheel of said train, and a beveled gear wheel 31 completing the gear train and meshing with a beveled gear 32 fixed upon the lower end of a shaft 33. The governor is mounted upon the plate 1 by means of a bracket 34. This governor which is shown in detail in Fig. 24 consists of the shaft 33 and fixed angled arms 35 which extend upon opposite sides of the shaft, and pivotally connected to the depending end portions of the arms 35 are angled arms 36 which at their lower ends carry balls 37. Slidable upon the shaft 33 is a sleeve 38 connected to the upper inner ends of the arms 36 by means of links 39 and the said sleeve carries two parallel disks 40 slightly spaced apart and which slide upon the shaft 33 with the sleeve. It will be obvious that the rotation of the arms 36 with the shaft 33 will cause the balls 37 to move outwardly and upwardly, thus lowering their inner ends and causing the sleeve 38 to move downwardly upon the shaft 33.

Secured to the frame plate 2 is a bracket frame 41 in the open end of which is pivotally mounted a shaft 42. Said shaft carries two diverging arms 43 and 44 respectively. The arm 43 is provided with a tip 45 which rests between the disks 40 of the governor, so that sliding movement of the said disks up and down the shaft 33 will lift and lower the arm 43 and rock the shaft 42. The arm 44 carries at its free end a wedge-shaped contact plate 46 which as the arm 44 is lowered passes between two vertically arranged metallic strips 47, the upper ends of which are curved outwardly to receive the contact plate 46. These strips are secured together but are spaced apart by a block of insulating material 48. The receiver circuit of the usual telephone is cut and the said strips 47 are provided with perforated ears at their lower ends and are inserted in the cut circuit, the conductor wire 49, 49ª being joined to said ears. It will be obvious therefore that as long as the arm 44 is lifted the receiver circuit will be broken, but as soon as the governor has obtained a certain speed, the arm 44 will be lowered and the circuit between the wires 49 and 49ª will be completed through the strips 47 and through the wedge 46.

A time dial 50 is carried by the plate 2, which is the front plate of the attachment and this dial is provided with a shaft 51 shown in detail in Fig. 17, the front end of which carries an index hand 52 and the rear end is angled as shown at 53 and is connected by a link 54 to one of the arms 28 of the friction disk 27. An arched lever 55 is connected at one end to the outer end portion of the winding lever 15 and the other end fits loosely over the reduced end portion 4 of the shaft 3 being held between suitable lock nuts and the convex face of the washer 29. This lever has a pin 28ᵃ and connects the winding lever indirectly to the shaft 3, so that the downward movement of said winding lever will rotate the said shaft, but it will be remembered that the lever 55 is loose upon said shaft, and upon upward movement of the winding lever there will be no reverse movement of the shaft.

In order to provide a signal code, I provide a carrying frame and the mechanism to be hereafter described. A plate 56 is pivoted to the plate 1, so as to have a slight vertical swinging movement, the free end of said plate working in a bracket 57, and the plate 56 carries midway its ends a pin 58 upon which is mounted a vertically arranged bar 59, the upper end of which is slotted as shown at 60. Mounted also upon the pin 58 are two disks 61 and 62, the central portions of said disks being secured rigidly together, but their longitudinal portions being spaced slightly apart, and the lower marginal portions of these disks are notched in a peculiar manner for the purpose of giving the desired signal, which notches will be described at length hereafter. Both bar 59 and the code signal disks are secured together by means of a suitable pin 63 which pin is carried by the bar 59 and engages one of a series of perforations 64 formed in the disks 61 and 62. The disks and bar 59 having been placed in position upon the pin 58 are locked thereon by a hinged bar 65, which bar is hinged at one end to the pivoted end portion of the bar 56, and the free end of said bar 56 is curved outwardly to form a spring catch for retaining and holding in a closed position the free end of the locking bar 65. This mounts the code disks 61 and 62 and their operating bar 59 in a frame composed of two parallel bars 56 and 65, the first of which is pivoted to swing vertically and the second of which is hinged to the first. A spring 66 is secured at one end to the plate 1 and its free curved end passes upwardly against the lower edge of the pivoted bar 56. Swinging movement of the bar 56 is obtained by means of a pivoted lever 67, said lever being pivoted at one end to a bracket 68 carried by the plate 1, and having its opposite end slotted as shown at 69, the slotted end of the lever 67 resting transversely across the upper slotted end portion of the bar 59. A linked rod 70 pivotally connects the lever 67 to the pivoted bar 56.

In order to rock the bar 59 and the lever 67 and thus impart a rocking motion to the disks 61 and 62, I provide a gear wheel 71 which meshes with a gear of the train 30, and which carries a disk 72 provided with a wrist pin 73 which pin passes through the slots 60 and 69 of the bar 59 and lever 67. It will therefore be obvious that during rotation of the gears, the rotation of the disk 72 will rock the bar 59, thus imparting a rocking movement of the disks 61 and 62, to which the bar is connected by a pin at a point above the center of said disks, and the disks will also be given at the same time a vertical movement by the rocking of the lever 67 and consequent swinging of the frame which carries said disks.

Coöperating with the signal disks 61 and 62 are two tongues 74 and 75 which are secured at one end to a suitable bracket 76 carried by the plate 1, and the free ends of these tongues, which in their use resemble tuning forks, are acted upon by teeth 78 and 79 formed respectively upon the disks 61 and 62. The tongues 74 and 75 are given a different pitch, one tongue having a low and the other a comparatively high pitch, the difference between the two being sufficiently great to be readily distinguished over the telephone wires. As the disks are rocked, the teeth 78 and 79 will vibrate these tongues. The teeth of one disk are offset with respect to those of the other and the number of the teeth and their arrangement differs upon each set of disks, so that no two attachments upon one party line have the same set of signals. The manner in which these signals are employed will appear more fully in the description of the operation of the device.

In order to lock the signal devices, when the telephone is not in use and to release them when the telephone is used, the following tripping mechanism is employed: A trip lever 80 is pivoted upon a stud bolt 81 connecting plates 1 and 2, and this trip lever is angled at its free end and supports the weight of the receiver 82 and the receiver hook 83. When so weighted down, the trip lever 80 will rest upon a bracket 84 attached to the front face of the plate 1, the said trip lever working between plates 1 and 2. But when the receiver is removed from the receiver hook, and the receiver hook lifts, as in the ordinary telephone, the trip lever will be moved upwardly, following the receiver hook and keeping in contact with it, through the action of a coil spring 85 connected at one end to the plate 1 and at the opposite end to the lever. Depending from the plate 56 is an arm 86 to which is pivotally connected a locking lever 87, the hook end 88 of which is pressed by a spring 89 into normal engagement with the lower notched end of the bar 59, and the outer end of the locking lever 87 is operatively connected to a vertically movable rod 90 the upper end of the rod being pivoted to a link 91 pivoted in turn to an upper corner portion of plate 1, the rod working midway its ends through a guide bracket 92. This rod is provided with a lug 93 which engages the trip lever 80. As the trip lever rises with the rise of the receiver hook, the rod 90 is lifted, and the hook end 88 of the lever 87 is depressed and disengages from the lower end of the bar 59. It will be obvious that as long as the said locking lever is in engagement with the bar 59 the bar will be held against rocking movement upon its pivotal point, thus holding the wrist pin 73 stationary, locking the lever 67, the gear train and the spring 10.

In order to regulate the speed of the governor, and consequently the other mechanism, I secure a block 94 to the plate 1 which carries a spring 95, and a suitable tension screw 96 bears upon the under side of this spring. The spring 95 bears upon the lower disk 40 of the governor and by adjusting the screw the pressure of the spring upon the said disk, and consequently the speed of the governor, when the sleeve 38 is forced downward by the balls against the said spring, is regulated.

The parts above described complete the attachment, and it can be applied to any form of telephone, the method of application depending to a great extent upon the form of the telephone to which it is to be applied. In order to attach it, it will be necessary, no matter what the make of the telephone, to arrange the attachment so that the receiver hook of the telephone will bear upon the trip lever and normally hold it against the bracket 84. It is also necessary to cut the receiver circuit and attach the cut ends to the metal strips 47, as shown at 49 and 49ª. Furthermore, as my attachment is connected to the front of the telephone, it will in most cases be necessary to add a longer transmitter arm as shown at 97, and the transmitter circuit is extended through this arm, but the original transmitter may of course be employed. With the exception of the cutting of the receiver circuit and the possible extending of the transmitter circuit to reach through the longer arm, no changes are made in the original telephone parts, and none of these parts are claimed as a part of this invention.

The operation of my attachment is as follows: The winding lever 15 is grasped by the handle and moved into its downward position. This movement causes the pin 16 to bear upon the projection 17 of the slotted plate 18, thus rotating the sleeve 8 and winding the spring 10. The spring cannot unwind, by reason of the engagement of the dog 7 with the ratchet 9, without rotating the shaft 3, and in order to permit the shaft to rotate, it is necessary to disengage the locking lever 87 from the bar 59. The winding of the spring therefore does not set the device in operation and after being forced down, the spring 22 draws the winding lever back to its normal position, leaving the spring 10 wound. A second downward movement of the winding lever at this time would have no effect upon the spring. The winding lever also through the arched lever 55 will set the index hand 52. The parts are now in position for use and as soon as the receiver is taken from the receiver hook, the hook will rise in the usual manner, thus permitting the rise of the tripping lever 86 which will lift the rod 90, thus operating the locking lever 87 and releasing the mechanism. The shaft 3 will now be driven by the spring 10, and through the train of gears the governor will be operated, and the disk 72, the wrist pin 73 of which rocks the bar 59 and the lever 67. The rocking of this bar and lever imparts the necessary motion to the disks 61 and 62 and the teeth upon said disks will engage the tongues 74 and 75, causing two or more musical notes to be sounded in succession, depending upon the arrangement of the said disks in their frames. It will be noted that these disks are provided with teeth arranged in groups, and as shown in the drawing the disk 62 has one tooth 78, then a space, and then a group of three teeth. The disk 61 has a group of two teeth which register with the space formed between the first and second groups of disk 62, then a space which extends beyond the second group, of disk 62, and the disk 61 is then provided with a single tooth. Assuming that the disk 61 engages a tongue having a low pitch and the disk 62 engages the tongue having the higher pitch, it will be obvious that if the dial is set so that the first teeth of disk 62 and the first group of two teeth of disk 61 engage the tongues, a signal consisting of one high and two low tones will be given. It will also be obvious that by turning the disks and fitting the pin 63 into another of the holes 64, the disks could be adjusted so that they would cause the tongues to give forth a different signal, and it will be understood that the disks may be provided with any number of such groups, which groups may be arranged in various order, and in each telephone upon a party line, the disks are locked in their frames so that no two will give forth the same signal. In order to further simplify the signals, it is intended that the tones given out are to correspond with the call. For example if the call of one party is one short ring, the disks in his telephone will be locked in position so that the signal will be one high note. If the call is one long and one short ring, the disks will be arranged to give one low and one high tone. In the example first given where the signal was one high and two low tones, the call would be one short and two long rings. It will be understood that the tones given out by these tongues are picked up by the transmitter and go out over the line, and through the action of the wrist pin, this signal call will be sent over the line at brief intervals during the entire time that the receiver is down and the mechanism running. This signal is heard by the party called up and would be also heard by any other parties who might cut into the circuit. It will now be obvious that if A and B were engaged in conversation and C whose call was one short and one long ring was to press down upon his winding lever and then take down his receiver, A and B would at once hear one high and one low tone, and they would know at once that C had placed his telephone into the circuit by removing the receiver from its hook, and this tell-tale signal would be transmitted to A and B as long as C kept his receiver from the hook. It is therefore obvious that before C could have an opportunity to hear any of the conversation between A and B, both of the latter would have received notice of C's act, and as his signal was the same as his call, they would have no difficulty in identifying the party who was listening or endeavoring to cut into the circuit. They could therefore request him to replace his receiver, and they could determine by the cessation of the signal when he had done so.

It will be understood that when the winding lever is pushed down, and at all times while the mechanism is not running, the receiver circuit is broken. After the receiver is lifted from the hook and the trip lever has released the mechanism, the operation of the governor will, through the arms 43 and 44 and the wedge-shaped contact plate 46, complete the circuit, and it may be further explained that the arm 44 is not connected directly to the plate 46, but carries a block of fiber or other insulating material 44ª to which the contact plate 46 is secured. The telephone cannot be used therefore for the purpose of hearing over the line until the attachment has been set in operation and the governor has reached a speed great enough to complete the circuit. As soon as the receiver is placed back upon the hook, the device will be relocked, and the stopping of the governor will break the circuit. During the time the attachment is running the index hand 52 will be traveling over the dial and when the device stops the position of the hand will indicate the number of minutes the telephone has been in use. The device is designed to run for a period of about ten minutes, without rewinding, although this time limit can be extended or shortened, by using a smaller or larger spring, or by any other desired means.

The musical tones sent out as signals during the time the device is running while clearly audible, will not interfere with the conversation, as would a bell, or other loud or harsh sound. The adjustment of the signal disks can be made by an employee of the telephone company and if it is desired to prevent the user of the telephone from tampering with said adjustment, any means may be employed for locking the hinged plate 65 in place, thus preventing any change in the signal sent out.

By means of an attachment constructed and operated as above described anyone using the telephone can readily determine the length of time they have used the telephone, and they can also detect and identify any person who may attempt to listen to conversation between themselves and another party.

What I claim is:

1. In an attachment for telephones, toothed disks, spring tongues each having a particular pitch in position to be engaged, respectively, by said tongues, and means for imparting a compound movement to said disks.

2. In a telephone attachment, a toothed disk, a spring, a sound emitting tongue, and means actuated by said spring for giving said disk a partial rotation and a vertical movement, as and for the purpose set forth.

3. In an attachment for telephones, a frame swinging in a vertical plane, toothed disks rotatably mounted in said frame, sound emitting tongues having a different pitch engaged respectively by said tongues upon movement of the frame and rotation of the disks, and means for rotating said disks and simultaneously swinging said frames.

4. In an attachment for telephones, sound emitting tongues, a spring, a winding lever for said spring, means operated by the unwinding of said spring for engaging and sounding said tongues, locking means, and a tripping mechanism for releasing the locking means, said tripping mechanism being automatically operated upon the removal of the telephone receiver from the receiver hook.

5. In a telephone attachment, a signal mechanism, means for operating said signal mechanism during the time a receiver is removed from the hook, locking means coöperating with the signal mechanism, and a tripping means for said locking means, the tripping means coöperating with and being held in inoperative position by the receiver hook.

6. An attachment of the kind described comprising a winding lever, a circuit making and breaking device interposed in a receiver circuit, a governor operating said circuit making and breaking device, a spring wound by movement of said winding lever, a signal device, said signal device being operated by the unwinding of the spring, a gear train driven by said spring operating the governor, means for locking all of the above mentioned mechanism with the exception of the winding lever, and a tripping lever for releasing said mechanism, said tripping lever being held in an inoperative position by the weight of the receiver, when upon the receiver hook.

7. In an attachment of the kind described, sound emitting tongues, adjustable toothed disks for engaging said tongues, spring operated means for rotating and locking said disks, means for winding the spring, means for locking said spring against unwinding, and a tripping lever for releasing said spring, said tripping lever being held inoperative by the receiver hook of the telephone when the receiver is in place.

8. The combination with a telephone having a receiver hook, a receiver, and a broken receiver circuit, a spring driven governor, a rock shaft, arms carried by said shaft, a contact plate carried by one of said arms, and adapted to complete the receiver circuit, the other arm being in engagement with and operated by the governor for the purpose of locking the shaft and making and breaking the receiver circuit, a time indicating device driven by said spring, and means for winding said spring.

9. In an attachment of the kind described, a spring driven gear train, means for winding the spring, a governor driven from said gear train, means operated by the governor for completing a receiver circuit, and a time indicating hand also driven by said spring, the said hand indicating the length of time the receiver circuit is completed.

10. A device of the kind described comprising two parallel plates, a shaft mounted in said plates, a disk fixed on said shaft a dog carried by said disk, a sleeve fitting loosely on the shaft, a ratchet on said sleeve in engagement with the dog, a coil spring secured at one end to the sleeve and at the other end to one of the plates, means for rotating said sleeve and winding the spring, a frame swinging in a vertical plane, toothed disks rotatably mounted in said frame, sound emitting tongues in position to be engaged by one or more teeth of said disks, the disks being adjustable in their bearings, a slotted bar rigidly secured to said disks, a slotted lever, a disk having a wrist pin engaging the slots of the bar and the lever, said disk being driven from the gear train, a link pivotally connecting the slotted lever to the swinging frame, a locking lever engaging the slotted bar, and a spring operated tripping mechanism for releasing said locking lever, said tripping mechanism being held inoperative by weight of the receiver upon the receiver hook, the receiver hook bearing upon an end portion of the tripping device when the receiver is in place, as and for the purpose set forth.

11. A device of the kind described comprising a spring driven shaft, a winding lever, a shaft parallel to the first mentioned shaft, a dial plate through which said last mentioned shaft passes, an index hand carried by the second mentioned shaft, a disk rotating with the first mentioned shaft, a link connecting an angled end portion of the second mentioned shaft to said disk, and an arched lever secured at one end upon the first mentioned shaft, and having its opposite end secured to the winding lever, movement of said winding lever in one direction winding the spring and setting said index hand.

ABEN GUSTAF HOWARD.

Witnesses:
J. E. BURGE,
ARCHER GUSTAFSON.